UNITED STATES PATENT OFFICE.

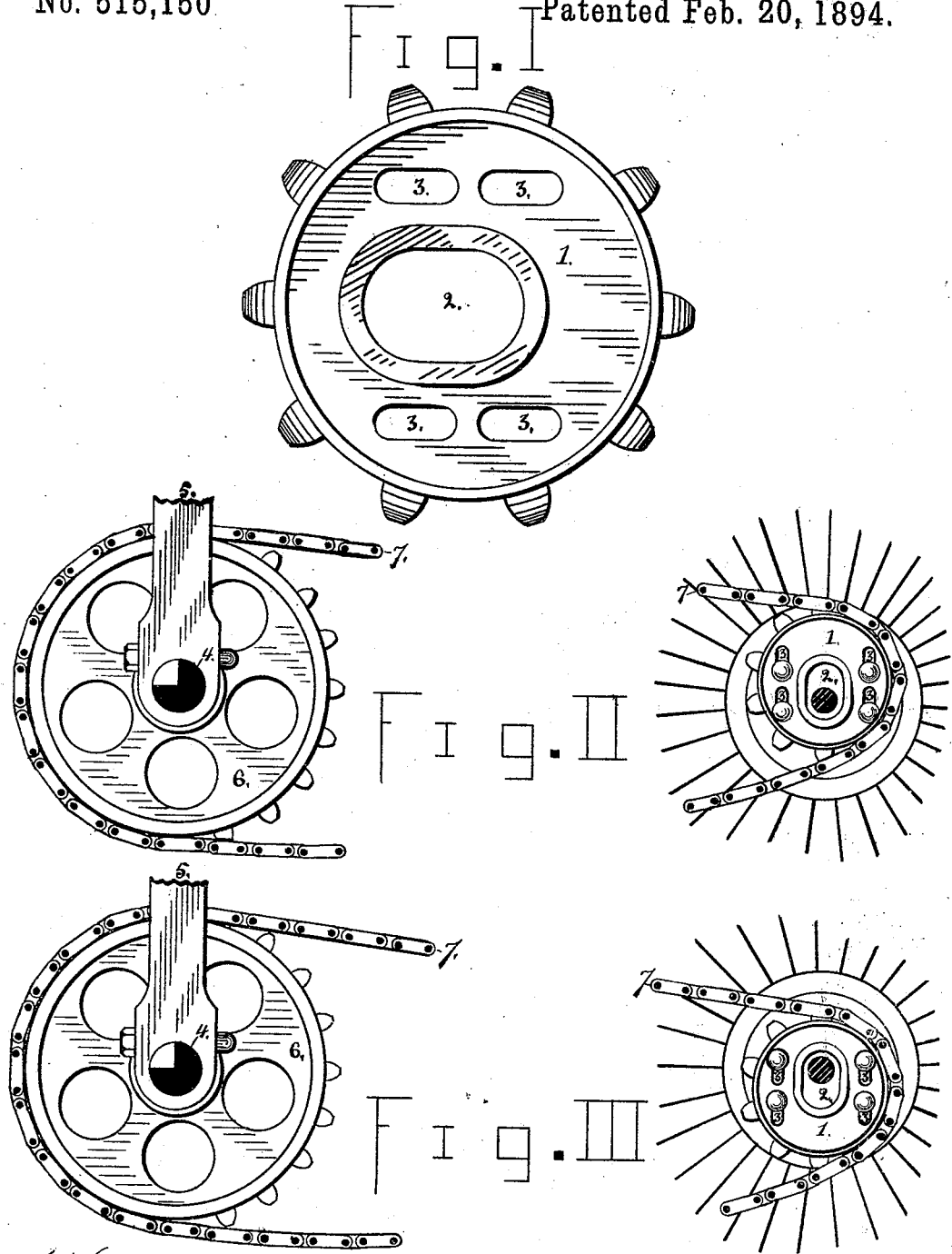

FREEMAN LILLIBRIDGE, OF EL PASO, TEXAS; EMMA JULIA LILLIBRIDGE ADMINISTRATRIX OF SAID FREEMAN LILLIBRIDGE, DECEASED.

BICYCLE.

SPECIFICATION forming part of Letters Patent No. 515,150, dated February 20, 1894.

Application filed January 13, 1893. Serial No. 468,207. (No model.)

*To all whom it may concern:*

Be it known that I, FREEMAN LILLIBRIDGE, a citizen of the United States, residing at El Paso, county of El Paso, State of Texas, have invented certain new and useful Improvements in Bicycles, of which the following is a specification.

The object of this invention is to construct a bicycle of the safety variety, with a compensating gearing for propelling the traction wheel of the machine, whereby the variations in leverage in the various positions assumed by the pedal crank are equalized; that is to say: where the leverage of the cranks is least advantageous the leverage of the chain belt on the sprocket wheel is greatest and vice versa or if power rather than speed is desired the gearing may be set in such relation that the greatest effect of the crank will coincide with the greatest leverage of the gear.

In the accompanying drawings, Figure I, is a side elevation of the chain gear wheel to be affixed to the hub of the traction wheel of the bicycle. Fig. II, is a side elevation of the pedal gear and the "driven" gear in their relative positions when set for greatest compensating effect and for highest speed. Fig. III, is a view of like parts shown in the preceding figure set, however for greatest power.

In the application of this plan of gearing to the usual style of safety bicycle, I provide a sprocket wheel, 1, not unlike the ordinary sprocket wheel excepting that the opening, 2, in its hub is elongated from the center toward one side, about which opening are ranged four elongated apertures, 3, their long diameters parallel with that of the central opening, 2. This sprocket wheel is bolted to the hub of the traction wheel of a bicycle by means of bolts passing through the apertures 3, in the web of the gear and through the hub of the traction wheel, the spindle of the wheel extending through the elongated opening 2, of the sprocket wheel. The sprocket is set "off center" as much as is desired and secured firmly in that position by means of the bolts before mentioned.

The crank shaft 4, the crank 5, the sprocket wheel 6, on the shaft and the connecting chain belt 7, are not different in form or function from like parts in all safety bicycles.

To set the eccentrically set "driven" sprocket, 1, for the greatest compensating effect as well as the highest speed, its long axis is set in a vertical plane, with the large side of the eccentric upward, the cranks also are placed in a vertical position and the endless driving chain adjusted over the pedal sprocket and the sprocket wheel 1, care being taken that sufficient slack be allowed in the chain to permit the rotation of the latter wheel.

When the upwardly extending crank 5, is depressed, with the sprocket wheels in the before described relative positions, the chain belt draws over a side of the wheel 1, which approaches the center as the crank descends, until the latter reaches the horizontal position when the eccentric gear 1, is at its least leverage and the chain is drawing over a point nearest its eccentric center. As the crank 5, descends from the horizontal and its leverage thereby becomes constantly less, the eccentric gear 1 increases its leverage by throwing the driving chain farther from its eccentric center until the crank reaches its lowest point and completes the revolution of the gear 1. Thus it will be understood that when the cranks are about the horizontal of their forward throw and when in position to exert their greatest leverage they move most slowly and when about the vertical position, most rapidly; an arrangement which gives the longest time for the most effective work.

To gear the machine for the greatest power the eccentric sprocket is given a half revolution relative to the pedal sprocket, 6, and the chain adjusted over the two wheels in this new relative position: that is to say; to gear for power the short side of the eccentric gear must be uppermost when the pedal cranks stand in a vertical position. With the parts in this new position it will be seen that as the crank descends from a perpendicular the leverage of the chain over the eccentric gear increases until the pedal reaches the horizontal line where the greatest power of the crank meets the greatest leverage of the chain on the sprocket 1.

The sprocket 1, which has one-half the number of teeth contained in the pedal gear, when set centrally with relation to the traction wheel of the bicycle, will gear the latter wheel in a ratio of two revolutions to every one of the pedal gear, 6, but when set eccentric to the axis of the traction wheel will give a varying ratio during different portions of the revolutions, always averaging for the whole revolution, however, the ratio named.

I claim as my invention—

1. A sprocket wheel having a rim, sprocket teeth thereon, a web, elongated openings through the web and an elongated opening about its center and extending therefrom toward the rim of the wheel.

2. In a bicycle, in combination, a main frame, a traction wheel and a supporting wheel therefor, a crank shaft, a sprocket wheel thereon, a sprocket wheel rotating with the traction wheel which sprocket wheel is adjustable in its degree of eccentricity and an endless chain belt for connecting the sprocket wheels.

3. In a bicycle, in combination, a main frame, a traction wheel and a supporting wheel therefor, a crank shaft, a sprocket wheel thereon, a sprocket wheel for the traction wheel, elongated openings in the web of the latter sprocket for adjustably attaching the sprocket wheel to the hub of the traction wheel and an endless chain belt for connecting the sprocket wheels.

FREEMAN LILLIBRIDGE.

Witnesses:
A. P. COLES,
S. O. LESSER.